No. 720,611. PATENTED FEB. 17, 1903.
J. L. McFARLANE.
STORM PROTECTOR FOR GRAIN RICKS.
APPLICATION FILED JAN. 14, 1902.
NO MODEL.
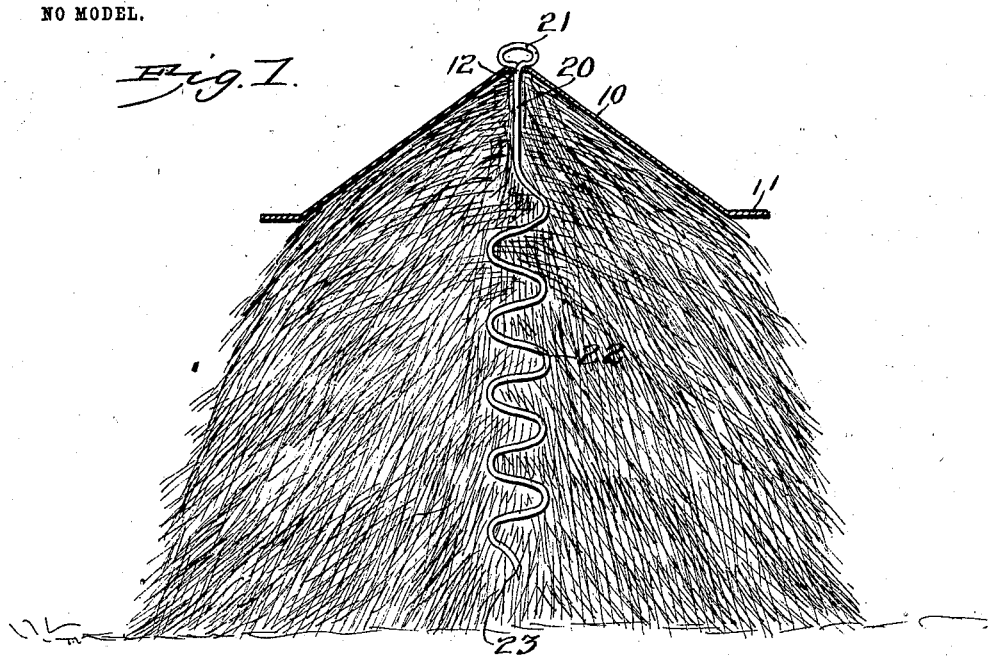
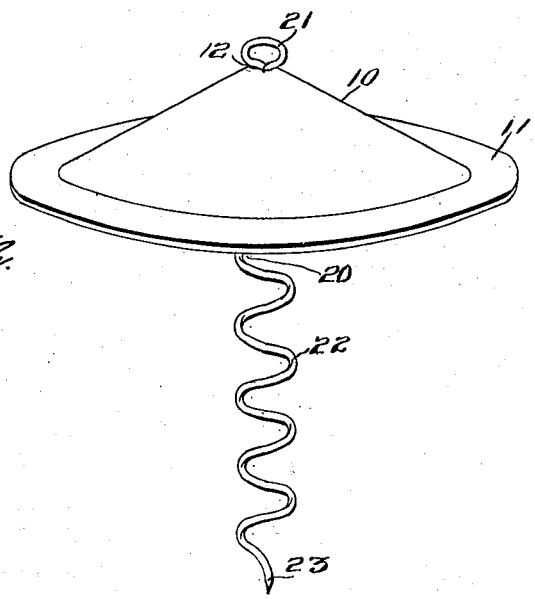

UNITED STATES PATENT OFFICE.

JAMES L. McFARLANE, OF PESHTIGO, WISCONSIN.

STORM-PROTECTOR FOR GRAIN-RICKS.

SPECIFICATION forming part of Letters Patent No. 720,611, dated February 17, 1903.

Application filed January 14, 1902. Serial No. 89,683. (No model.)

*To all whom it may concern:*

Be it known that I, JAMES L. McFARLANE, a citizen of the United States, residing at Peshtigo, in the county of Marinette and State of Wisconsin, have invented a new and useful Storm-Protector for Grain-Ricks, of which the following is a specification.

This invention relates to improved storm-protectors for sheltering hay and corn ricks or any kind of goods which it may be desired to protect from rain, snow, frost, and wind.

The object of the invention is to provide a simple and efficient protector especially adapted for sheltering haycocks and grain-ricks from rain, frost, and snow and which acts as a clamp to hold the material protected securely together and prevent its being blown around and scattered by the wind.

Figure 1 of the accompanying drawings represents a vertical section of a haycock, showing this improved protector applied thereto, the securing means being shown in side elevation. Fig. 2 represents a perspective view of the protector detached.

The same reference-numerals indicate corresponding parts in both the figures.

In the drawings the device is shown applied to a haycock, and the shield is made in the form of a cap 10, composed of any suitable material, preferably galvanized iron, and having a horizontal flange 11 at the lower edge thereof for shedding the rain or snow off from the sides of the cock. The top or apex of this cap is provided with an opening 12 therein for receiving a holding device now to be described. This clamping or holding device is preferably made in the form of a rod 20, bent at its upper end to form a loop-shaped handle 21 and bent through the greater portion of its length in the form of a worm or corkscrew 22, provided with a sharpened point 23. This corkscrew-shaped holder may be made of any suitable material, preferably of heavy wire, or when used for large ricks it may be made of an iron rod bent in the described form.

In operation the cap 10 is placed on top of the cock or other rick, such as that shown in the drawings, and the rod 20 is inserted through the opening 12 therein and screwed down into the hay or other material until the handle 21 abuts against the top of the cap. This screwing of the corkscrew-shaped rod into the hay binds it between the worms thereof and the inner face of the cap 10 and holds it together safely and prevents it from being blown away in a storm.

The shield or cap 10 is herein shown circular or cone shaped; but it may be made in any other desired shape desirable for protecting mounds of various shapes.

It will be observed by reference to Fig. 1 of the drawings that the upper portion of the rod is straight for a considerable distance between the handle 21 and the worm portion 22 thereof. This straight portion enables a considerable quantity of hay to be compressed between the worm and the cap, and the cap being slidable on the straight portion of the rod descends as the haycock settles and shrinks, and thus the cap is kept in close contact with the top of the haycock.

I claim as my invention—

A storm-shield of the class described, comprising a concavo-convex cap adapted to be placed on a haycock or the like, with the concave side lowermost, and a worm-rod adapted to be screwed downwardly into the haycock, and having a straight upper portion revoluble and slidable in a central opening in the cap, the upper end of said straight upper portion of the worm-rod having a handle whereby the worm-rod may be turned, substantially as described.

In testimony that I claim the foregoing as my own I have hereto affixed my signature in the presence of two witnesses.

JAMES L. McFARLANE.

Witnesses:
J. F. SLIGHT,
CHAS. BUMP.